(12) United States Patent
Yang

(10) Patent No.: US 10,268,532 B2
(45) Date of Patent: Apr. 23, 2019

(54) APPLICATION MESSAGE PROCESSING SYSTEM, METHOD, AND APPLICATION DEVICE

(71) Applicant: TENCENT TECHNOLOGY (SHENZHEN) COMPANY LIMITED, Shenzhen (CN)

(72) Inventor: Tao Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/827,456

(22) Filed: Nov. 30, 2017

(65) Prior Publication Data

US 2018/0081746 A1 Mar. 22, 2018

Related U.S. Application Data

(63) Continuation of application No. PCT/CN2016/083366, filed on May 25, 2016.

(30) Foreign Application Priority Data

Aug. 25, 2015 (CN) .......................... 2015 1 0527042

(51) Int. Cl.
G06F 9/54 (2006.01)
H04L 12/18 (2006.01)
(Continued)

(52) U.S. Cl.
CPC .............. G06F 9/546 (2013.01); H04L 12/18 (2013.01); H04L 51/00 (2013.01); H04L 63/061 (2013.01);
(Continued)

(58) Field of Classification Search
None
See application file for complete search history.

(56) References Cited

U.S. PATENT DOCUMENTS

| 8,005,200 B2 | 8/2011 | Fotta et al. |
| 2002/0025046 A1* | 2/2002 | Lin ...................... H04L 9/0844 380/282 |

(Continued)

FOREIGN PATENT DOCUMENTS

| CN | 101051923 A | 10/2007 |
| CN | 101068243 A | 11/2007 |

(Continued)

OTHER PUBLICATIONS

The World Intellectual Property Organization (WIPO) International Search Report for PCT/CN2016/083366 dated Aug. 4, 2016 5 Pages (including translation).

*Primary Examiner* — Craig C Dorais
(74) *Attorney, Agent, or Firm* — Anova Law Group, PLLC

(57) ABSTRACT

The present disclosure provides an application message processing system, method, and application device. The processing system includes an application device and a message forwarder. The application device is configured to perform authentication on a transmitting-end corresponding to a received first-type application message, send the first-type application message to the message forwarder if the transmitting-end has a message sending permission; perform authentication on a target receiving-end corresponding to a received second-type application message, and initiate a consumption operation of the second-type application message to the target receiving-end if the target receiving-end has a message receiving permission. The message forwarder is configured to receive the first-type application message (Continued)

from the application device, or to send the second-type application message to the application device.

16 Claims, 6 Drawing Sheets

(51) Int. Cl.
  *H04L 29/06* (2006.01)
  *H04L 12/58* (2006.01)
(52) U.S. Cl.
  CPC ............ *H04L 63/08* (2013.01); *H04L 63/126* (2013.01); *H04L 63/06* (2013.01)

(56) References Cited

U.S. PATENT DOCUMENTS

2003/0229789 A1* 12/2003 Morais .................... H04L 9/083
                                                                    713/171
2007/0050618 A1*  3/2007 Roux ...................... H04L 9/321
                                                                    713/155

FOREIGN PATENT DOCUMENTS

| CN | 101150425 A | 3/2008 |
| CN | 101400036 A | 4/2009 |

* cited by examiner

APPLICATION MESSAGE PROCESSING SYSTEM, METHOD, AND APPLICATION DEVICE

RELATED APPLICATION

This application is a continuation application of PCT Patent Application No. PCT/CN2016/083366, filed on May 25, 2016, which claims priority to Patent Application No. 201510527042.5, entitled "APPLICATION MESSAGE PROCESSING SYSTEM, METHOD, AND APPLICATION DEVICE" filed on Aug. 25, 2015, the entire content of both of which is incorporated herein by reference.

FIELD OF THE TECHNOLOGY

The present disclosure relates to the field of computer application technologies and, in particular, to an application message processing system and method, and an application device.

BACKGROUND OF THE DISCLOSURE

A message system is a distributed message forwarding platform, mainly for transmitting messages between services, e.g., receiving a message of an application in a storing-and-forwarding manner, and transmitting the message to a target application. In a large-scale service, data processed is usually forwarded by using the message system.

In a current message forwarding system, application message forwarding processing is performed by a message broker. The system has a relatively high software/hardware requirement on the message broker. In addition, when there is a relatively large quantity of messages, message processing efficiency of such system is relatively low.

SUMMARY

Embodiments of the present invention provide an application message processing system and method, and an application device, to improve message forwarding processing efficiency.

An embodiment of the present invention provides an application message processing system, including an application device and a message forwarder, wherein
the application device is configured to: perform authentication on a transmitting-end that corresponds to a received first-type application message, and send the first-type application message to the message forwarder when the transmitting-end has a message sending permission; and is configured to perform authentication on a target receiving-end that corresponds to a received second-type application message, and initiate a consumption operation of the second-type application message to the target receiving-end when the target receiving-end has a message receiving permission; and
the message forwarder is configured to receive an application message from the application device, or send an application message to the application device.

An embodiment of the present invention further provides an application message processing method, including:
receiving an application message;
when the application message is a first-type application message, performing authentication on a transmitting-end that sends the first-type application message, and forwarding the first-type application message when the transmitting-end has a message sending permission; or
when the application message is a second-type application message, performing authentication on a target receiving-end that corresponds to the second-type application message, and initiating a consumption operation of the second-type application message to the target receiving-end when the target receiving-end has a message receiving permission.

An embodiment of the present invention further provides another application message processing method, including:
performing, by an application device, authentication on a transmitting-end that corresponds to a received first-type application message, and sending the first-type application message to a message forwarder when the transmitting-end has a message sending permission;
receiving, by the message forwarder, the first-type application message, and forwarding the first-type application message to a target receiving-end of the first-type application message;
when receiving a second-type application message sent to the application device, sending, by the message forwarder, the second-type application message to the application device; and
performing, by the application device, authentication on a target receiving-end that corresponds to the received second-type application message, and initiating a consumption operation of the second-type application message to the target receiving-end when the target receiving-end has a message receiving permission.

According to the application message processing system in the embodiments of the present invention, an application device performs authentication processing, and a message forwarder only performs application message forwarding, thereby reducing a software/hardware requirement on the message forwarder, and improving application message processing efficiency.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show merely some embodiments of the present invention, and persons of ordinary skill in the art may derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present disclosure.

Figure 1:
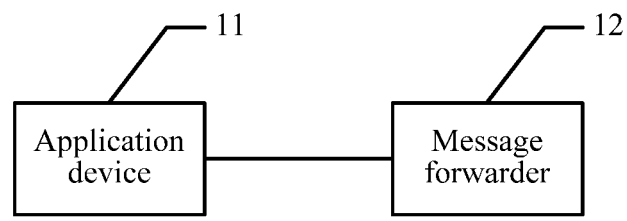
FIG. 1 is a schematic structural diagram of an application message processing system according to an embodiment of the present invention.

FIG. 1 is a schematic structural diagram of an application message processing system according to an embodiment of the present invention. Referring to FIG. 1, the system in this embodiment of the present invention includes an application device 11 and a message forwarder 12. The application device 11 may include various intelligent terminals, such as a terminal that has a network function, including a smartphone, a tablet computer, a personal computer, and an intelligent wearable device. The message forwarder 12 may be a service side message broker. During specific implementation, the system may include multiple application devices 11 and message forwarders 12 according to an actual situation.

The application device 11 is configured to: perform authentication on a transmitting-end that corresponds to a received first-type application message, and send the first-type application message to the message forwarder 12 if the transmitting-end has a message sending permission. The application device 11 is also configured to perform authentication on a target receiving-end that corresponds to a received second-type application message, and initiate a consumption operation of the second-type application message to the target receiving-end if the target receiving-end has a message receiving permission. A transmitting-end may include any appropriate entity capable of transmitting messages, such as an application, a function, a process, a terminal, or other software/hardware entities. Similarly, a receiving-end may include any appropriate entity capable of receiving messages, such as an application, a function, a process, a terminal, or other software/hardware entities.

The message forwarder 12 is configured to receive an application message from the application device 11, or send an application message to the application device 11.

The application device 11 may distinguish the first-type application message from the second-type application message according to an attribute, a source, or the like of a message. In short, if the application message is generated by an application of the application device 11, or is generated by an application installed on another intelligent terminal, the application message is a first-type application message; or if the application message is from the service side message forwarder 12, the application message is a second-type application message.

The first-type application message may be a message generated by an application, such as an instant messaging application or a social networking application configured to generate an application message. These applications may be installed on the application device 11. After the first-type application message is generated, the application device 11 may store the first-type application message in a message generation queue in a shared memory, and then a process that implements the foregoing function and that is in the application device 11 extracts the first-type application message from the message generation queue in the shared memory and receives the first-type application message.

After receiving the first-type application message, the application device 11 performs authentication to determine whether the application device 11 has a message sending permission. The authentication may be performed on the application device 11 according to configuration information that is used for authentication and that is download from the service side. Specifically, the configuration information used for authentication may include an identifier of a device and/or a sending permission key. When an identifier (a source ID) of the application device 11 and/or a sending permission key carried in the first-type application message can be found in the configuration information, it is considered that the application device 11 that sends the first-type application message has a sending permission. If the authentication succeeds, the first-type application message may be sent to the message forwarder 12. If the authentication fails, the first-type application message is discarded.

Alternatively, the foregoing application configured to generate the application message may be installed on another intelligent terminal that may be in data connection with the application device 11. After generating the first-type application message, these related applications in the intelligent terminal send the first-type application message to the application device 11. Likewise, the application device 11 performs the authentication on the intelligent terminal according to the identifier of the intelligent terminal and/or the sending permission key carried in the first-type application message and according to the configuration information that is used for authentication and downloaded from the service side.

When receiving the second-type application message sent by the message forwarder 12, the application device 11 determines, according to an identifier (a target ID) of a target receiving-end carried in the second-type application message, whether the target receiving-end has a receiving permission. The application device 11 may determine, according to the configuration information that is used for authentication and that is downloaded from the service side, whether the identifier of the target receiving-end is configured as having a receiving permission, i.e., whether the target receiving-end has the receiving permission. If the target receiving-end has a receiving permission, a consumption operation of the second-type application message is initiated to the target receiving-end. Alternatively, comparison may be performed between a receiving permission key carried in the second-type application message and each receiving permission key in the configuration information. If the configuration information has a same receiving permission key as that carried in the second-type application message, the authentication succeeds.

The foregoing message operation mainly includes: if the target receiving-end of the second-type application message is the application device 11, sending the second-type application message to the message consumption queue configured in a memory, so that a related application process can extract the second-type application message from the message consumption queue; or if the target receiving-end of the second-type application message is another intelligent terminal, establishing, by the application device 11, a data connection to the target receiving-end, and sending the second-type application message to the target receiving-end.

According to the application message processing system in this embodiment of the present invention, an application device performs authentication processing, and a message forwarder only performs application message forwarding, thereby reducing a software/hardware requirement on the message forwarder, and improving application message processing efficiency.

Figure 2:
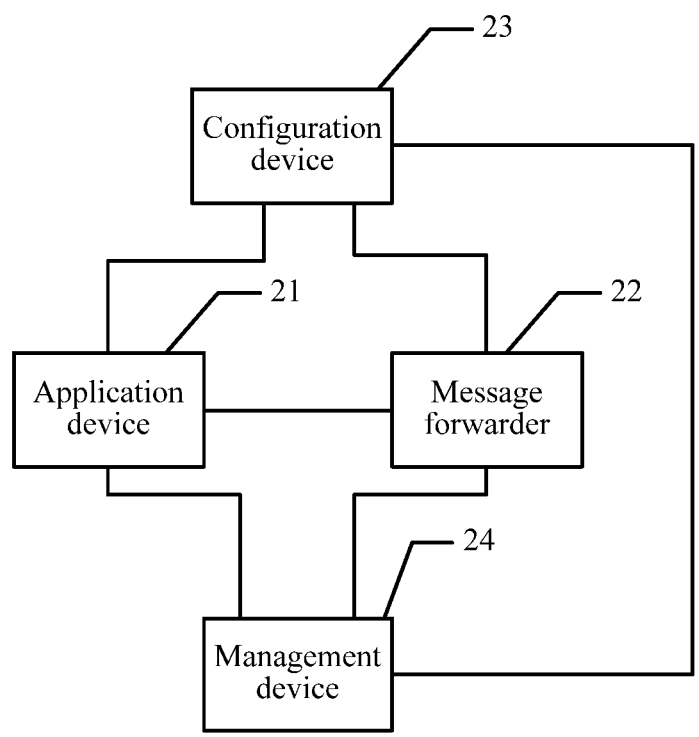
FIG. 2 is a schematic structural diagram of another application message processing system according to an embodiment of the present invention.

Further, referring to FIG. 2, FIG. 2 is a schematic structural diagram of another application message processing system according to an embodiment of the present invention. The system in this embodiment of the present invention includes: an application device 21, a message forwarder 22, a configuration device 23, and a management device 24. The application device 21 may be an intelligent terminal device, the message forwarder 22, the configuration device 23, and the management device 24 may separately be a service side server.

The application device 21 is configured to: perform authentication on a transmitting-end that corresponds to a received first-type application message, and send the first-type application message to the message forwarder 22 if the transmitting-end has a message sending permission; and is also configured to perform authentication on a target receiving-end that corresponds to a received second-type application message, and initiate a consumption operation of the second-type application message to the target receiving-end if the target receiving-end has a message receiving permission.

The message forwarder 22 is configured to receive an application message from the application device 21, or send an application message to the application device 21.

Further, the application device 21 is further configured to: discard the first-type application message when the transmitting-end has no sending permission; or discard the second-type application message when the target receiving-end has no message receiving permission. Specifically, deletion processing may be performed on the first-type application message or the second-type application message.

The configuration device 23 is configured to configure a message sending permission and a message receiving permission for a message device. The message device includes the transmitting-end and the target receiving-end.

The configuration device 23 configures, for the message device, a transmit permission and/or message receiving permission according to an identifier reported by the message device, and sends the identifier of the message device and a sending permission key and/or a receiving permission key that corresponds to the message device to the application device 21.

The message device refers to an intelligent device on which a corresponding application that can generate an application message is installed. The message device may be the application device 21 or may be the foregoing transmitting-end or the target receiving-end.

A mapping table may be set for the configuration device 23, and a device identifier ID is mapped to a sending permission or a receiving permission and is recorded one by one. Alternatively, a corresponding sending permission key and/or a receiving permission key of the message device is stored, and is broadcasted to each application device 21 in a broadcast manner, so that these application devices 21 perform authentication on the transmitting-end or the target receiving-end according to the mapping table or the sending permission key and/or the receiving permission key, and perform forwarding processing on a received application message.

In this embodiment of the present invention, the sending permission or the receiving permission of the message device is obtained by the message device by means of application by sending application information to the configuration device 23 (a configuration server). The configuration device 23 broadcasts configuration information in real time or periodically according to an application status.

The configuration device 23 further configures a message sending type for the message device, and sends the identifier of the message device and a message type configured for the message device to the message forwarder 22. The message sending type includes a broadcast message type and a mutual exclusion message type.

In this embodiment of the present invention, the message sending type of the message device is also obtained by the message device by requesting from the configuration device 23. When a requested message sending type of a message device is a broadcast message type, broadcast processing is performed on messages generated by the message device. When an applied message sending type of a message device is a mutual exclusion message type, a message generated by the message device is sent only to another message device in an infinite quantity.

The message forwarder 22 is further configured to perform, according to the identifier of the message device and the message type of the message device, a forwarding operation on the application message received from the application device 21. The forwarding operation includes a broadcast operation that corresponds to the broadcast message type and a single sending operation that corresponds to the mutual exclusion message type.

The application device 21 is configured to: obtain the first-type application message from a message generation queue configured in a memory, and perform authentication by using the application device 21 as the transmitting-end that corresponds to the first-type application message; and when receiving the second-type application message, perform authentication by using the application device 21 as the target receiving-end that corresponds to the second-type application message; and after the authentication succeeds, send the second-type application message to a message consumption queue configured in the memory.

The management device 24 is in data connection with the application device 21 and the message forwarder 22, and is configured to manage communication identification information of the application device 21 and the message forwarder 22, so that mutual communication is performed between the application device 21 and the message forwarder 22 based on the communication identification information managed in the management device 24.

Figure 3:
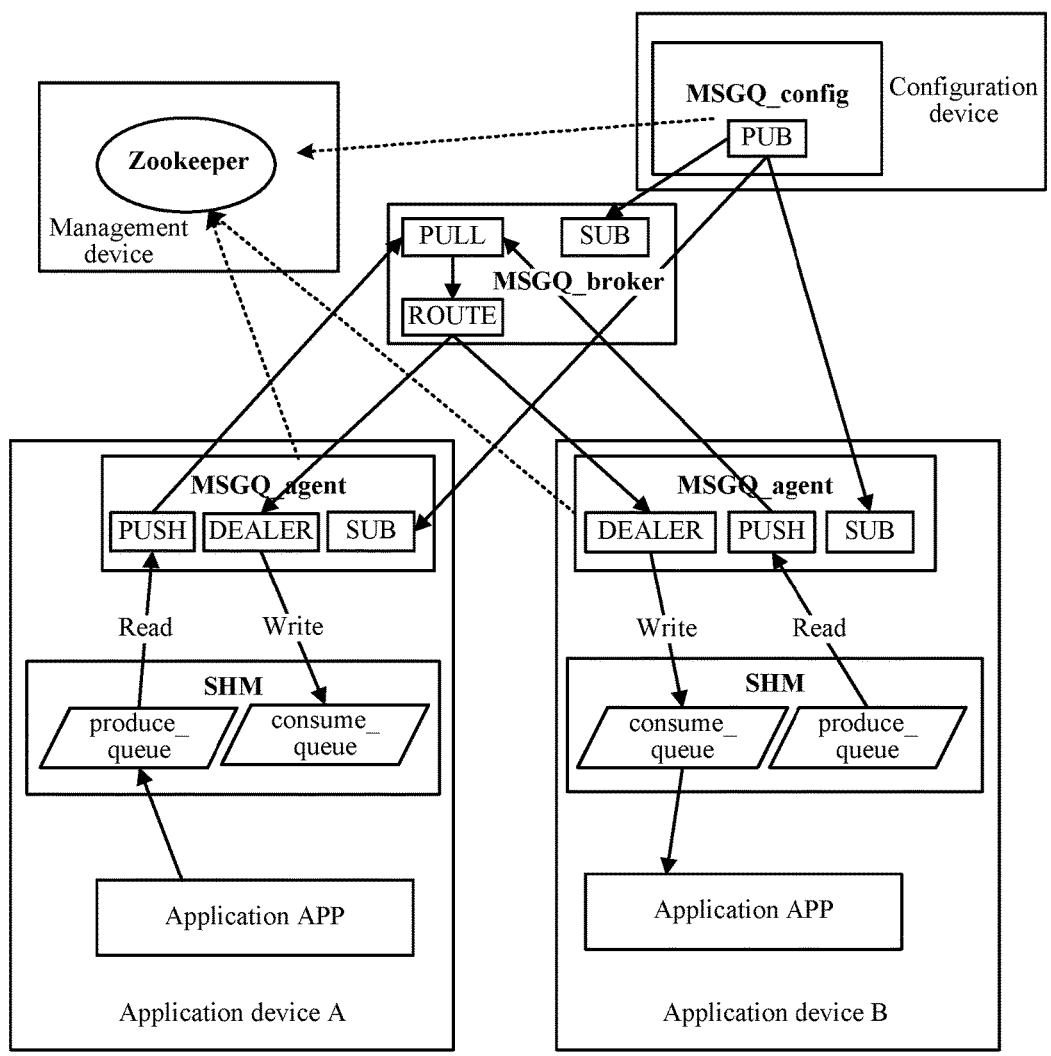
FIG. 3 is a schematic structural diagram of a specific application message processing system according to an embodiment of the present invention.
Figure 4:
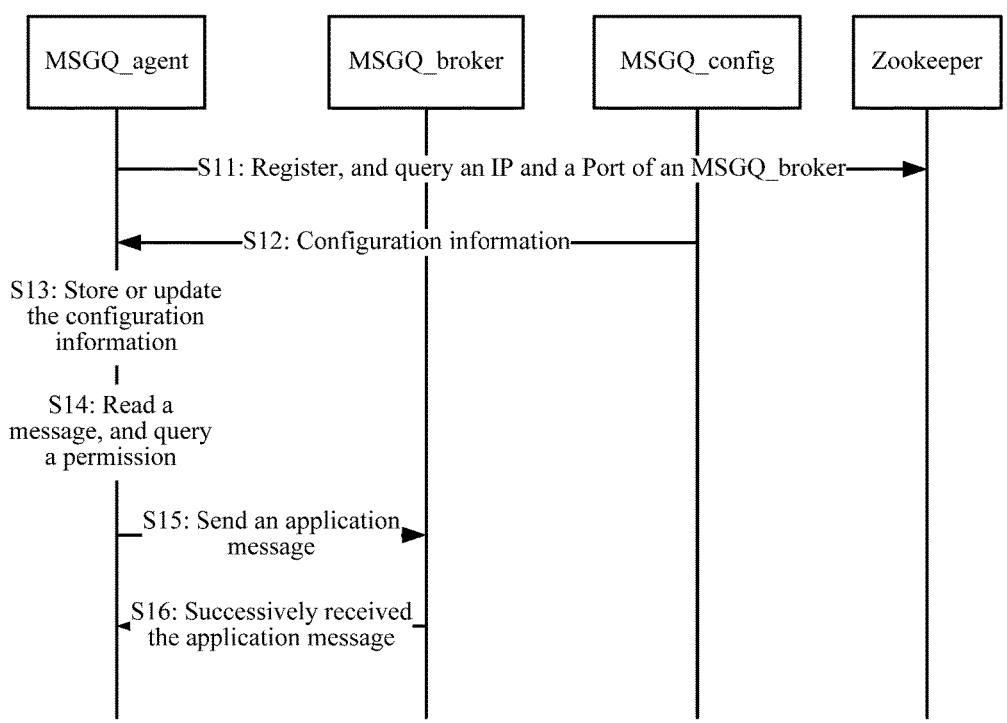
FIG. 4 is a schematic flowchart of an application message generation method according to an embodiment of the present invention.
Figure 5:
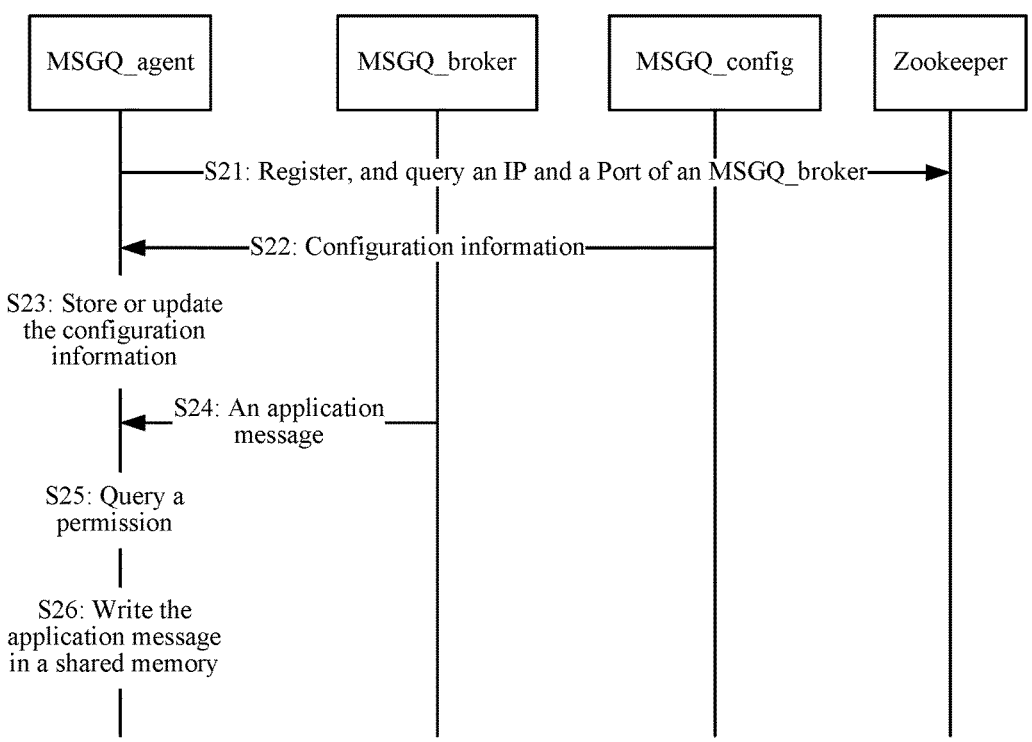
FIG. 5 is a schematic flowchart of an application message consumption method according to an embodiment of the present invention.

The following describes in detail an application message processing system and a specific example of a processing procedure with reference to FIG. 3, FIG. 4, and FIG. 5.

The system may include four main modules: a management device on which a Zookeeper is deployed, a configuration device on which an MSGQ_config is deployed, a message forwarder on which an MSGQ_broker is deployed, and an application device on which an MSGQ_agent is deployed. The Zookeeper is an open-source distributed name service system, and provides a configuration management function for the system. The MSGQ_config, the MSGQ_broker, and the MSGQ_agent are main functional modules of the system. The MSGQ_agent as well as an application are deployed on the application device. Message generation and consumption are performed between the MSGQ_agent and the application by using a shared memory. This may improve a speed of generating and consuming an application message by the application.

A Zookeeper service is a highly-reliable distributed system, configured to: manage configuration of a system, receive an application message, and process registration and query of each module in the system. The MSGQ_config, the MSGQ_broker, and the MSGQ_agent services are used for message processing and distribution.

Before performing message distribution by using this distributed system, each MSGQ_agent needs to request, from the MSGQ_config, a message type and a permission for generating (sending) or consuming (receiving) the message. A message type and information about a sending or receiving permission are stored by the MSGQ_config for a corresponding device, and is broadcasted to the MSGQ_broker and the MSGQ_agent in a timely manner. The application generates a message for the MSGQ_agent by calling an interface of a message system. After receiving an application message, the MSGQ_agent forwards the application message to the MSGQ_broker. The MSGQ_broker distributes the application message of the MSGQ_agent to a designated target MSGQ_agent according to configuration of the MSGQ_config. Finally, the target MSGQ_agent that receives the application message is responsible for forwarding the application message to a target application. The target application consumes a message and performs logical processing. Distribution of the distributed message system is ended for one time.

In this system, the MSGQ_config, the MSGQ_broker, and the MSGQ_agent services are all deployed in a distributed manner. According to messaging scale of a message system, any service may be deployed on one or more such modules. The system may perform expansion at a very high speed without affecting service quality. The MSGQ_broker is responsible for message receiving and forwarding of messages, has message storage activities on the messages, and may be deployed in multiples.

In this embodiment of the present invention, distribution of the application messages may be divided into two types: broadcast distribution and mutual exclusion queue distribution. Different types of distribution need to be performed by the MSGQ_broker according to the message type. In the broadcast distribution, a message can be broadcasted to all MSGQ_agents that apply for consuming the message. In the mutual exclusion queue distribution, only one MSGQ_agent grabs the message. The broadcast distribution and the mutual exclusion queue distribution are applied to two different scenarios. For example, configuration information needs to be distributed in a broadcast manner, and logical processing of an application message only needs to be distributed to an MSGQ_agent by means of mutual exclusion. A service that corresponds to an application may apply for different message types by using an application device according to an application scenario of the service, and then performs generation and consumption.

The following describes in detail a function of each module.

For the management device on which a Zookeeper is deployed:

The system receives registration and query of each service, and includes an MSGQ_config, an MSGQ_broker, an MSGQ_agent, an application, or the like. After starting a process, each service is registered with the Zookeeper, and then keeps a heartbeat with the Zookeeper. The Zookeeper is responsible for maintaining information such an IP of each service, and provides a query function to another service.

Because the MSGQ_config, the MSGQ_broker, and the MSGQ_agent of the system are multiple equal machines, exit or crash of any service process does not affect a normal function of the system. After the process exits, the process is no longer registered with the Zookeeper. When finding that the process is not registered with in a timely manner, the Zookeeper deletes the configuration of the machine, and another service request is no longer forwarded to the deleted machine.

For the configuration device on which an MSGQ_config is deployed:

The process MSGQ_config starts, registers information about an IP and a port of the MSGQ_config with the Zookeeper, and keeps the heartbeat.

Configuration information of the message type is read locally or from MySQL, including a unique identity ID of a message, a type (a broadcast message or a mutual exclusion queue message) of the message, and a generation or consumption key that corresponds to the message ID.

A device IP of message generation permission and consumption permission are read. Before generating or consuming a message, any device needs to apply for a corresponding permission. Permission protection prevents a message system from being attacked by a malicious program.

Configuration information of a message is broadcasted by using a ZeroMQ PUB socket. All MSGQ_brokers and MSGQ_agents that SUB the configuration information receive the configuration information.

An application device on which an MSGQ_agent is deployed is a message generation and consumption server. Further, referring to FIG. 4 and FIG. 5, FIG. 4 and FIG. 5 describe a message generation and consumption procedure. FIG. 4 shows a generation procedure of an application message. The generation procedure specifically includes S11 to S26.

S11: An MSGQ_agent process on an application device A starts, registers with a Zookeeper, and queries a device IP and a port Port of a message forwarder MSGQ_broker, and then keeps a heartbeat with the Zookeeper.

S12: The MSGQ_agent receives broadcast configuration information of an MSGQ_config.

S13: The MSGQ_agent stores or updates the configuration information, for control and query of a subsequent message generation or consumption permission of an application process.

The application process of the application device A generates a message, and writes a message ID and message content to a message generation queue produce_queue in a shared memory SHM.

S14: The MSGQ_agent reads an application message in a message queue produce_queue (message generation queue) in a shared memory, queries whether the application device has a message ID generation permission (sending permission), and directly discards the application message if the application device has no message ID generation permission (sending permission).

S15: The application device pushes PUSH, if having a sending permission, the application message (including a message ID and message content) to an MSGQ_broker, and the MSGQ_agent determines, by using the broadcast configuration information of MSGQ_config, a message forwarder on which an MSGQ_broker is deployed.

S16: The MSGQ_broker receives and successively returns the message, and a message generation procedure is completed.

FIG. 5 shows an application message consumption procedure, including the following steps.

S21: An MSGQ_agent process on an application device B starts, registers with a Zookeeper, and queries a device IP and a port Port of a message forwarder MSGQ_broker, and then keeps a heartbeat with the Zookeeper.

S22: The MSGQ_agent receives broadcast configuration information of an MSGQ_config.

S23: The MSGQ_agent stores or updates the configuration information, for control and query of a subsequent message generation or consumption permission of an application process.

S24: The MSGQ_agent on the application device B receives an application message by means of a dealer DEALER or by pulling PULL.

S25: The MSGQ_agent determines whether the application device B has a message ID consumption permission (receiving permission), and directly discards the application message if the application device B has no message ID consumption permission (receiving permission).

S26: The MSGQ_agent writes the received application message (including a message ID and message content) in a consumption queue consume_queue (a message consumption queue) in a shared memory if the application device B has a receiving permission.

An application process of the application device B consumes the message, reads the message from the consume_queue, and then performs logical processing. Up till now, a message consumption procedure is ended.

For the message forwarder on which an MSGQ_broker is deployed:

The process MSGQ_broker starts, registers information about an IP and a port of the MSGQ_broker with the Zookeeper, and keeps a heartbeat with the Zookeeper.

The MSGQ_broker receives broadcast configuration information of a MSGQ_config by means of SUB, and stores or updates the configuration information, for subsequent message forwarding of a message generated or consumed by an application process.

The MSGQ_broker receives an application message sent by an MSGQ_agent, stores the application message, and then parses a message ID, and processes the application message. If the configuration information obtained according to the SUB is a broadcast message, the message is pushed, by using a router ROUTER, all MSGQ_agents that apply for and have consumption permissions; otherwise, the configuration information obtained according to the SUB is a mutual exclusion queue message, and the message is pushed, by PUSH, to every MSGQ_agent that applied for and has the consumption permission.

The message forwarding is completed and, afterwards, the message is deleted. Up till now, a message forwarding procedure is ended.

According to the application message processing system in this embodiment of the present invention, an application device performs authentication processing, and a message forwarder only performs application message forwarding, thereby reducing a software/hardware requirement on the message forwarder, and improving application message processing efficiency.

The following describes in detail an application message processing method in an embodiment of the present invention.

Figure 6:
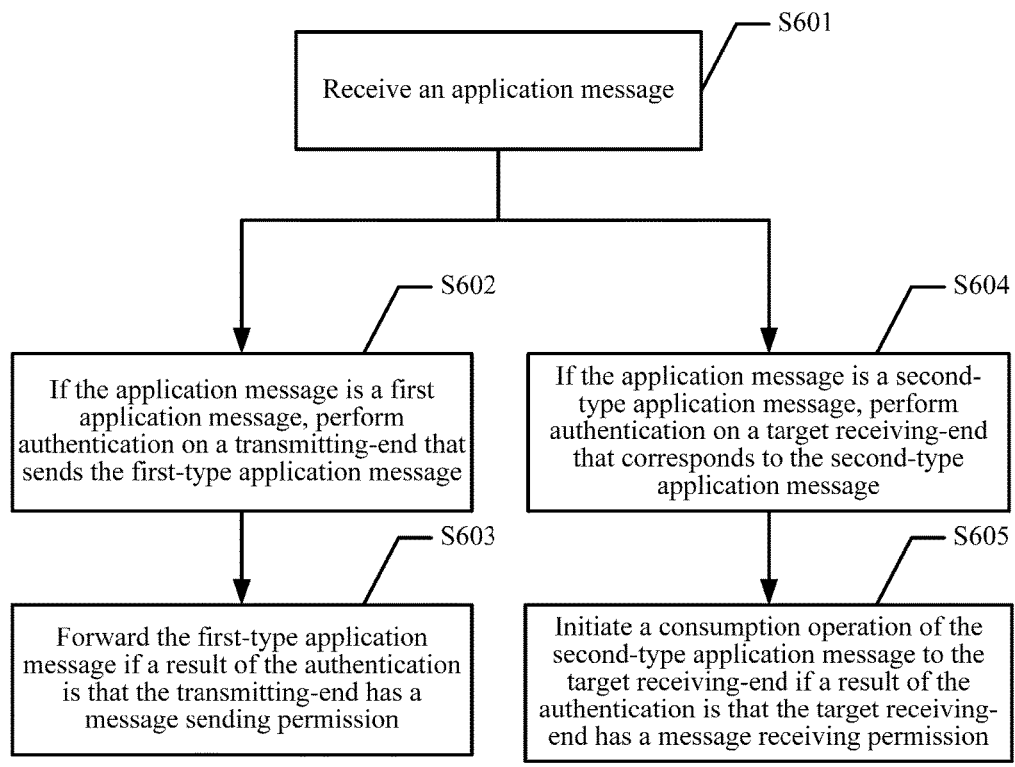
FIG. 6 is a schematic flowchart of an application message processing method according to an embodiment of the present invention.

Referring to FIG. 6, FIG. 6 is a schematic flowchart of an application message processing method according to an embodiment of the present invention. The method in this embodiment of the present invention may be performed by an application device, such as the foregoing application device on which the MSGQ_agent is deployed and that is used for authentication and sending messages. As shown in FIG. 6, the method specifically includes S601 to S605.

S601: Receiving an application message.

S602: If the application message is a first-type application message, performing authentication on a transmitting-end that sends the first-type application message.

S603: Forwarding the first-type application message if a result of the authentication is that the transmitting-end has a message sending permission. Specifically, the first-type application message may be forwarded by determining an IP, a port Port, or the like of a corresponding message forwarder by querying a service side management device.

S604: If the application message is a second-type application message, performing authentication on a target receiving-end that corresponds to the second-type application message.

S605: Initiating a consumption operation of the second-type application message to the target receiving-end if a result of the authentication is that the target receiving-end has a message receiving permission.

According to the foregoing system embodiment, if a received application message is from another application device or is from a shared memory, the received application message is a first-type application message; or if the received application message is from a service side message forwarder, the received application message is a second-type application message. Alternatively, the authentication may be performed by using configuration information (a mapping table, a receiving permission key, a sending permission key, or the like) obtained from the service side.

Further, the method in this embodiment of the present invention may further include: discarding the first-type application message when the transmitting-end has no sending permission; or discarding the second-type application message when the target receiving-end has no message receiving permission. That is, when the authentication fails, deletion processing is directly performed on the application message.

To correctly perform the authentication, related configuration information may be received from the service side in real time or periodically in this embodiment. Specifically, before receiving an application message, the method further includes: receiving an identifier of a message device and a sending permission key and/or a receiving permission key that corresponds to the message device; and managing and storing the received identifier of the message device and the sending permission key and/or the receiving permission key that corresponds to the message device, so that a sending permission or a receiving permission that corresponds to the message device is determined by means of authentication. The message device includes the transmitting-end and the target receiving-end.

In this embodiment of the present invention, the manner in which an application message is received includes: obtaining and receiving an application message from a message generation queue configured in a memory, where the application message obtained from the message generation queue is a first-type application message.

Alternatively, the manner in which an application message is received includes: receiving an application message from a message forwarder that is in data connection, where the application message received from the message forwarder is a second-type application message. In addition, the initiating a consumption operation of the second-type application message to the target receiving-end includes: sending the second-type application message to a message consumption queue configured in a memory, so that the target receiving-end obtains the second-type application message from the message consumption queue.

Specifically, for specific implementation from S601 to S603, refer to the related descriptions of the corresponding embodiments in FIG. 1 to FIG. 5.

According to the application message processing system in this embodiment of the present invention, an application device performs authentication processing, and a message forwarder only performs application message forwarding, thereby reducing a software/hardware requirement on the message forwarder, and improving application message processing efficiency.

Figure 7:
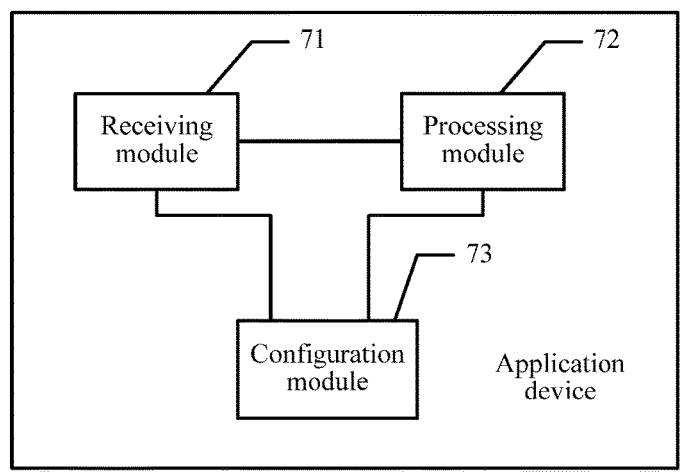
FIG. 7 is a schematic structural diagram of an application device according to an embodiment of the present invention.

Further, FIG. 7 is a schematic structural diagram of an application device according to an embodiment of the present invention. The application device in this embodiment of the present invention may be an intelligent terminal, such as a smartphone, a tablet computer, a personal computer, or an intelligent wearable device that has a network function, and may be specifically the foregoing application device in which the MSGQ_agent is configured. Specifically, referring to FIG. 7, the application device includes:

a receiving module 71, configured to receive an application message; and a processing module 72, configured to: if the application message is a first-type application message, perform authentication on a transmitting-end that sends the first-type application message, and forward the first-type application message if a result of the authentication is that the transmitting-end has a message sending permission; or if the application message is a second-type application message, perform authentication on a target receiving-end that corresponds to the second-type application message, and initiate a consumption operation of the second-type application message to the target receiving-end if a result of the authentication is that the target receiving-end has a message receiving permission.

Further, optionally, the processing module 72 is further configured to: discard the first-type application message when the transmitting-end has no sending permission; or discard the second-type application message when the target receiving-end has no message receiving permission.

Further, optionally, the receiving module 71 is further configured to receive an identifier of a message device and a sending permission key and/or a receiving permission key that corresponds to the message device.

The application device further includes a configuration module 73 that is configured to manage and store the received identifier of the message device and the sending permission key and/or the receiving permission key that corresponds to the message device, so that a sending permission or a receiving permission that corresponds to the message device is determined by means of authentication. The message device includes the transmitting-end and the target receiving-end.

Further, optionally, the receiving module 71 is configured to obtain an application message from a message generation queue configured in a memory. The application message obtained from the message generation queue is a first-type application message.

Further, optionally, the receiving module 71 is configured to receive an application message from a message forwarder that is in data connection. The application message received from the message forwarder is a second-type application message.

The processing module 72 is configured to send the second-type application message to a message consumption queue configured in the memory, so that the target receiving-end obtains the second-type application message from the message consumption queue.

Specifically, for specific implementation of the application device in this embodiment of the present invention, refer to the related descriptions of the corresponding embodiments in FIG. 1 to FIG. 6.

According to the application message processing system in this embodiment of the present invention, an application device performs authentication processing, and a message forwarder only performs application message forwarding, thereby reducing a software/hardware requirement on the message forwarder, and improving application message processing efficiency.

Figure 8:
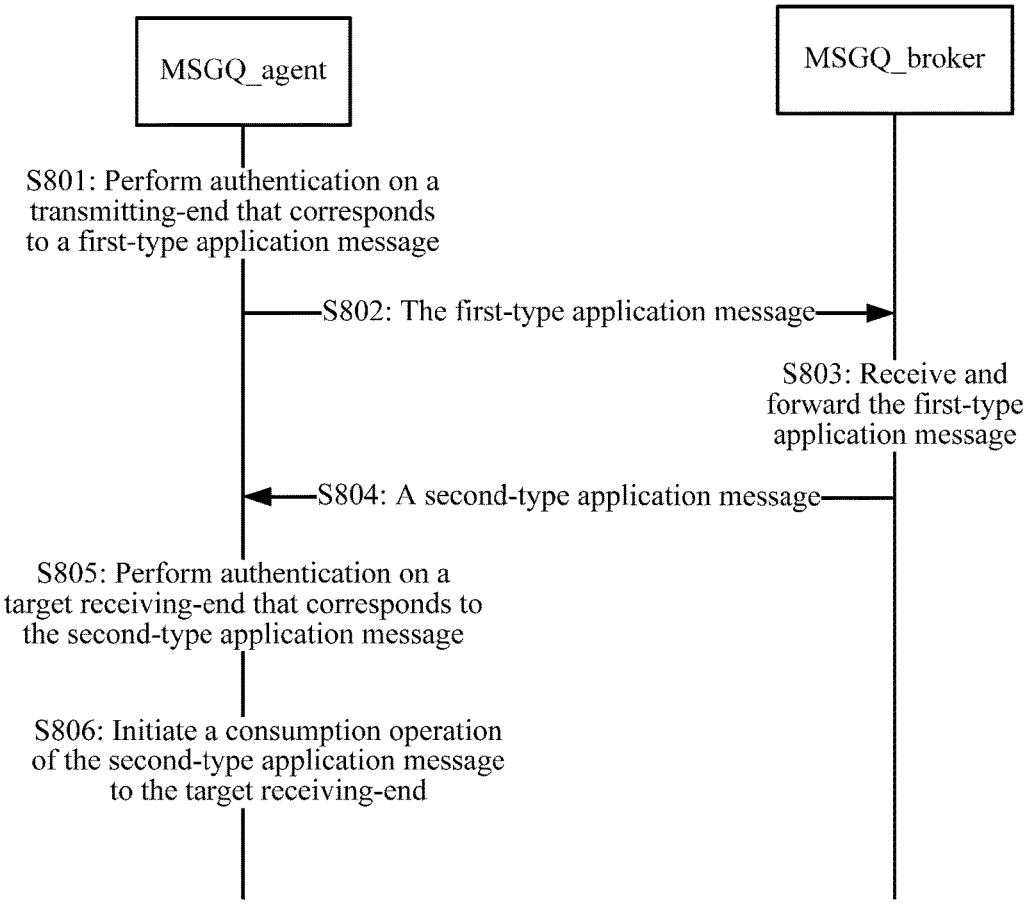
FIG. 8 is a schematic flowchart of another application message processing method according to an embodiment of the present invention.

Referring to FIG. 8, FIG. 8 is a schematic flowchart of another application message processing method according to an embodiment of the present invention. The method in this embodiment of the present invention includes S801 to S806.

S801: An application device performs authentication on a transmitting-end that corresponds to a received first-type application message.

S802: Send the first-type application message to the message forwarder if the transmitting-end has a message sending permission.

S803: The message forwarder receives and forwards the first-type application message to a target receiving-end of the first-type application message. Optionally, a success notification message may be returned to the application device.

S804: When receiving a second-type application message sent to the application device, the message forwarder sends the second-type application message to the application device.

S805: The application device performs authentication on a target receiving-end that corresponds to the received second-type application message.

S806: Initiate a consumption operation of the second-type application message to the target receiving-end if the target receiving-end has a message receiving permission.

Further, optionally, the method may further include: discarding, by the application device, the first-type application message when the transmitting-end has no sending permission; or discarding, by the application device, the second-type application message when the target receiving-end has no message receiving permission.

Further, optionally, the method may further include: configuring, by a configuration device, a message sending permission and a message receiving permission for a message device. The message device includes the transmitting-end and the target receiving-end.

Further, optionally, the method may further include: configuring, by the configuration device according to an identifier reported by the message device, a sending permission and/or a message receiving permission for the message device, and sending the identifier of the message device and the sending permission key and/or the receiving permission key that corresponds to the message device to the application device.

Further, optionally, the method may further include: configuring, by the configuration device, a message sending type for the message device, and sending an identifier of the message device and a message type configured for the message device to the message forwarder. The message sending type includes a broadcast message type and a mutual exclusion message type.

Further, optionally, the method may further include: performing, by the message forwarder according to the identifier of the message device and the message type of the message device, a forwarding operation on the application message received from the application device. The forwarding operation includes a broadcast operation that corresponds to the broadcast message type and a single sending operation that corresponds to the mutual exclusion message type.

Further, optionally, the application device obtains the first-type application message from a message generation queue configured in a memory, and performs authentication by using the application device as the transmitting-end that corresponds to the first-type application message; and when receiving the second-type application message, performs authentication by using the application device as the target receiving-end that corresponds to the second-type application message; and after the authentication succeeds, sends the second-type application message to a message consumption queue configured in the memory.

Further, optionally, the method may further include: storing and managing, by a management device, communication identification information of the application device and the message forwarder, so that mutual communication is performed between the application device and the message forwarder based on the communication identification information managed in the management device.

Specifically, for specific implementation of each step in this embodiment of the present invention, refer to the related descriptions of the corresponding content in the embodiments in FIG. 1 to FIG. 7.

According to the application message processing system in this embodiment of the present invention, an application device performs authentication processing, and a message forwarder only performs application message forwarding, thereby reducing a software/hardware requirement on the message forwarder, and improving application message processing efficiency.

Persons of ordinary skill in the art may understand that all or some of the procedures used for implementing the method according to any embodiment of the present invention may be implemented by calling a computer program to instruct related hardware. For example, the computer program may be stored in a computer readable storage medium. When the program is called, the hardware (such as a machine, a device, a computing apparatus, a computer system, or hardware related to a network) may perform the operation in each method embodiment above. The storage medium may be a magnetic disk, an optical disc, a read-only memory (Read-Only Memory, ROM), a random-access memory (Random Access Memory, RAM), or the like. In addition, the computer readable storage medium may further be various types of recording media that may be accessed by a computer apparatus by using a network or a communications link, such as a recording medium that can extract data from the computer apparatus by using a router, the Internet, or a local area network. In addition, the computer readable storage medium may refer to multiple computer readable storage media located in, for example, a same computer system, or may refer to a computer readable storage medium distributed in, for example, multiple computer systems or computing apparatuses.

Figure 9:
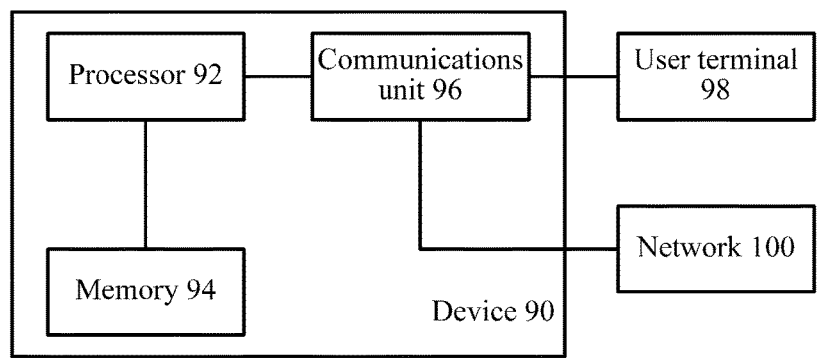
FIG. 9 is a structural block diagram of a device according to an embodiment of the present invention.

In addition, an embodiment of the present invention further provides a device. FIG. 9 is a structural block diagram of a device 90 according to the present disclosure. In an implementation, the device according to this embodiment of the present invention may be a server, or another computing device, or a machine device. As shown in FIG. 9, the device 90 may include a processor 92 and a memory 94, and optionally, includes a communications unit 96. The processor 92 may be considered as a control center of the device, and the processor 92 is connected to another component in the device by using an interface or a line in a wired or wireless manner. In an implementation, the processor 92 may be connected to the memory 94 by using a data bus. The processor 92 may be connected to a user terminal 98 or a network 100 by using an interface (which may be a wired interface or a wireless interface) or a communications unit 96 in a wired or wireless manner, to implement data exchange and communication with the external. Similarly, the memory 94 may include but is not limited to: a ROM, a RAM, a CD-ROM, another erasable memory, or the like. The memory 94 stores program code, a functional module, or the like. Specifically, the memory 94 stores a computer program or a functional module. When the processor 92 invokes and executes, by accessing the memory 94, the computer program or the functional module stored in the memory 94, the operation of the method or apparatus according to any embodiment of the present invention may be implemented. In addition, the method and apparatus in the embodiments of the present invention are described above in detail with reference to FIG. 1 to FIG. 8, and are not described herein again to avoid an unnecessary blur of the present disclosure.

The foregoing descriptions are merely exemplary embodiments of the present invention, and are certainly not intended to limit the protection scope of the present disclosure. Therefore, equivalent variations made according to the claims of the present disclosure shall fall within the scope of the present disclosure.

What is claimed is:

1. An application message processing system, comprising:
  an application device;
  a configuration device; and
  a message forwarder coupled to the application device,
  wherein the application device is configured to:
    perform authentication on a transmitting-end corresponding to a received first-type application message,
    send the first-type application message to the message forwarder when the transmitting-end has a message sending permission;
    perform authentication on a target receiving-end corresponding to a received second-type application message, and
    initiate a consumption operation of the second-type application message to the target receiving-end when the target receiving-end has a message receiving permission;
  the message forwarder is configured to receive the first-type application message from the application device, or to send the second-type application message to the application device;

the configuration device is configured to:
configure the message sending permission and the message receiving permission for a message device, the message device including the transmitting-end and the target receiving-end;
configure a message sending type for the message device; and
send an identifier of the message device and the message sending type configured for the message device to the message forwarder, the message sending type including a broadcast message type and a mutual exclusion message type.

2. The system according to claim 1, wherein the application device is further configured to:
discard the first-type application message when the transmitting-end has no sending permission; or discard the second-type application message when the target receiving-end has no message receiving permission.

3. The system according to claim 1, wherein the configuration device is configured to:
configure, for the message device according to an identifier reported by the message device, the message sending permission or the message receiving permission, and
send the identifier of the message device and a sending permission key or a receiving permission key that corresponds to the message device to the application device.

4. The system according to claim 1, wherein the message forwarder is further configured to:
perform, according to the identifier of the message device and the message type of the message device, a forwarding operation on the application message received from the application device, the forwarding operation including a broadcast operation that corresponds to the broadcast message type and a single sending operation that corresponds to the mutual exclusion message type.

5. The system according to claim 1, wherein the application device is configured to:
obtain the first-type application message from a message generation queue configured in a memory, and perform the authentication by using the application device as the transmitting-end that corresponds to the first-type application message; and
when receiving the second-type application message, perform the authentication by using the application device as the target receiving-end that corresponds to the second-type application message; and after the authentication succeeds, send the second-type application message to a message consumption queue configured in the memory.

6. The system according to claim 1, further comprising:
a management device in data connection with the application device and the message forwarder, and is configured to:
manage communication identification information of the application device and the message forwarder, so that mutual communication is performed between the application device and the message forwarder based on the communication identification information managed in the management device.

7. An application message processing method, comprising:
receiving an application message;
when the application message is a first-type application message, performing authentication on a transmitting-end that sends the first-type application message, and forwarding the first-type application message when it is determined that the transmitting-end has a message sending permission after the authentication; or
when the application message is a second-type application message, performing authentication on a target receiving-end that corresponds to the second-type application message, initiating a consumption operation of the second-type application message to the target receiving-end when it is determined that the target receiving-end has a message receiving permission after the authentication, and sending the second-type application message to a message consumption queue configured in a memory, so that the target receiving-end obtains the second-type application message from the message consumption queue;
wherein the application message is received from a message forwarder, and the application message received from the message forwarder being the second-type application message.

8. The method according to claim 7, further comprising:
discarding the first-type application message when the transmitting-end has no sending permission; or discarding the second-type application message when the target receiving-end has no message receiving permission.

9. The method according to claim 7, wherein, before receiving an application message, the method further comprises:
receiving an identifier of a message device and a sending permission key or a receiving permission key that corresponds to the message device; and
managing and storing the received identifier of the message device and the sending permission key or the receiving permission key that corresponds to the message device, so that the message sending permission or the message receiving permission that corresponds to the message device is determined by the authentication, wherein the message device includes the transmitting-end and the target receiving-end.

10. The method according to claim 7, wherein the receiving an application message comprises:
obtaining the application message from a message generation queue configured in the memory, the application message obtained from the message generation queue being a first-type application message.

11. An application message processing method, comprising:
configuring, by a configuration device, a message sending permission and a message receiving permission for a message device, the message device including a transmitting-end and a target receiving-end;
configuring, by the configuration device, a message sending type for the message device, and sending an identifier of the message device and the message sending type configured for the message device to a message forwarder, the message sending type including a broadcast message type and a mutual exclusion message type;
performing, by an application device, authentication on the transmitting-end that corresponds to a first-type application message, and sending the first-type application message to the message forwarder when the transmitting-end has the message sending permission;
receiving, by the message forwarder, the first-type application message, and forwarding the first-type application message to the target receiving-end of the first-type application message;

when receiving a second-type application message sent to the application device, sending, by the message forwarder, the second-type application message to the application device; and performing, by the application device, authentication on the target receiving-end that corresponds to the received second-type application message, and initiating a consumption operation of the second-type application message to the target receiving-end when the target receiving-end has the message receiving permission.

12. The method according to claim 11, further comprising:

discarding, by the application device, the first-type application message when the transmitting-end has no sending permission; or discarding, by the application device, the second-type application message when the target receiving-end has no message receiving permission.

13. The method according to claim 11, further comprising:

configuring, by the configuration device according to an identifier reported by the message device, the message sending permission or the message receiving permission for the message device, and sending the identifier of the message device and a sending permission key or a receiving permission key that corresponds to the message device to the application device.

14. The method according to claim 11, further comprising:

performing, by the message forwarder according to the identifier of the message device and the message type of the message device, a forwarding operation on the application message received from the application device, the forwarding operation including a broadcast operation that corresponds to the broadcast message type and a single sending operation that corresponds to the mutual exclusion message type.

15. The method according to claim 11, further comprising:

obtaining, by the application device, the first-type application message from a message generation queue configured in a memory, and performing the authentication by using the application device as the transmitting-end that corresponds to the first-type application message; and when receiving the second-type application message, performing the authentication by using the application device as the target receiving-end that corresponds to the second-type application message; and after the authentication succeeds, sending the second-type application message to a message consumption queue configured in the memory.

16. The method according to claim 11, further comprising:

storing and managing, by a management device, communication identification information of the application device and the message forwarder, so that mutual communication is performed between the application device and the message forwarder based on the communication identification information managed in the management device.

* * * * *